Figure 1:
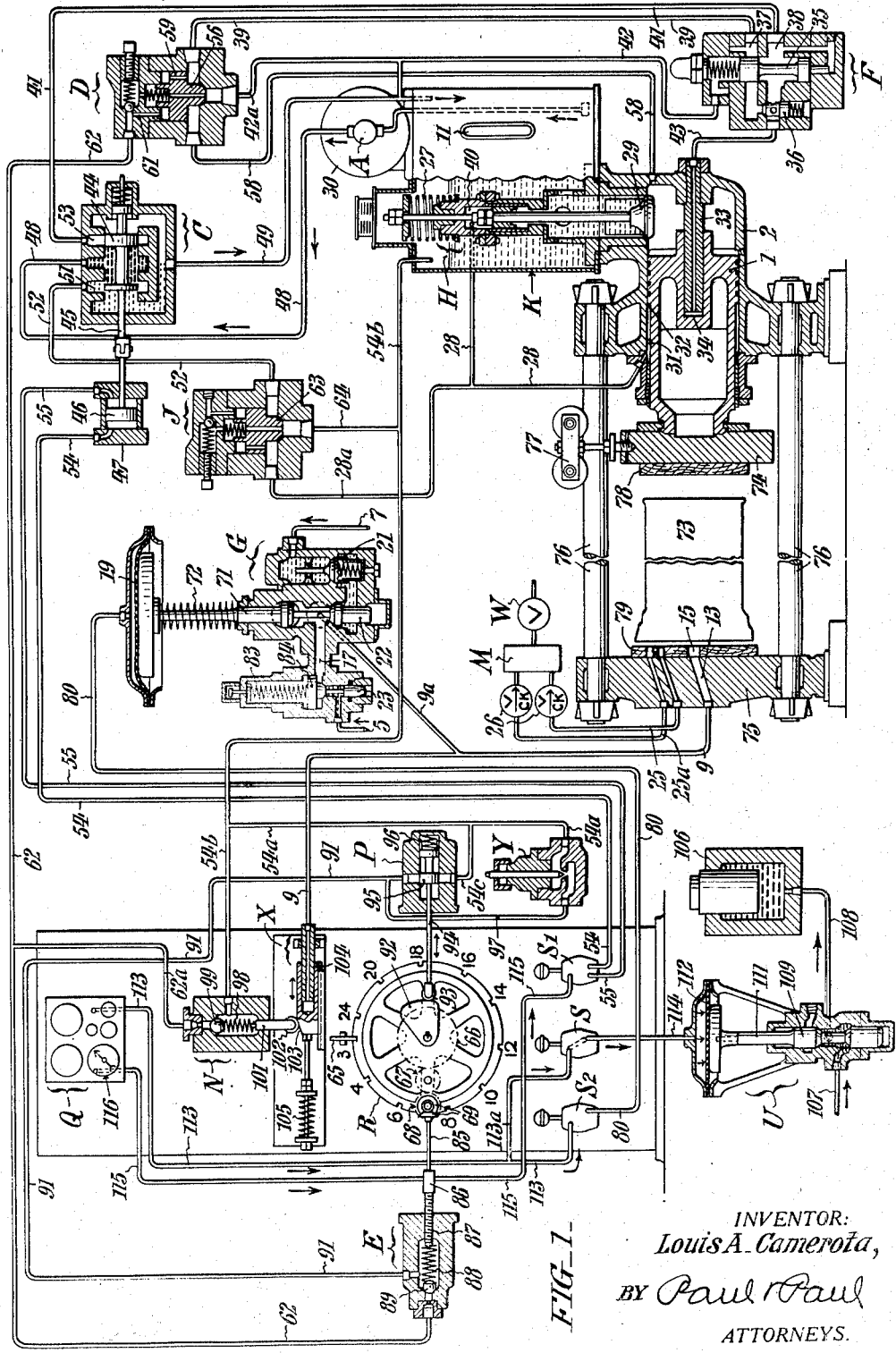

Sept. 19, 1950     L. A. CAMEROTA     2,522,927

PIPE-TESTING MACHINE

Filed March 19, 1948     6 Sheets-Sheet 1

INVENTOR:
*Louis A. Camerota*,
BY *Paul & Paul*
ATTORNEYS.

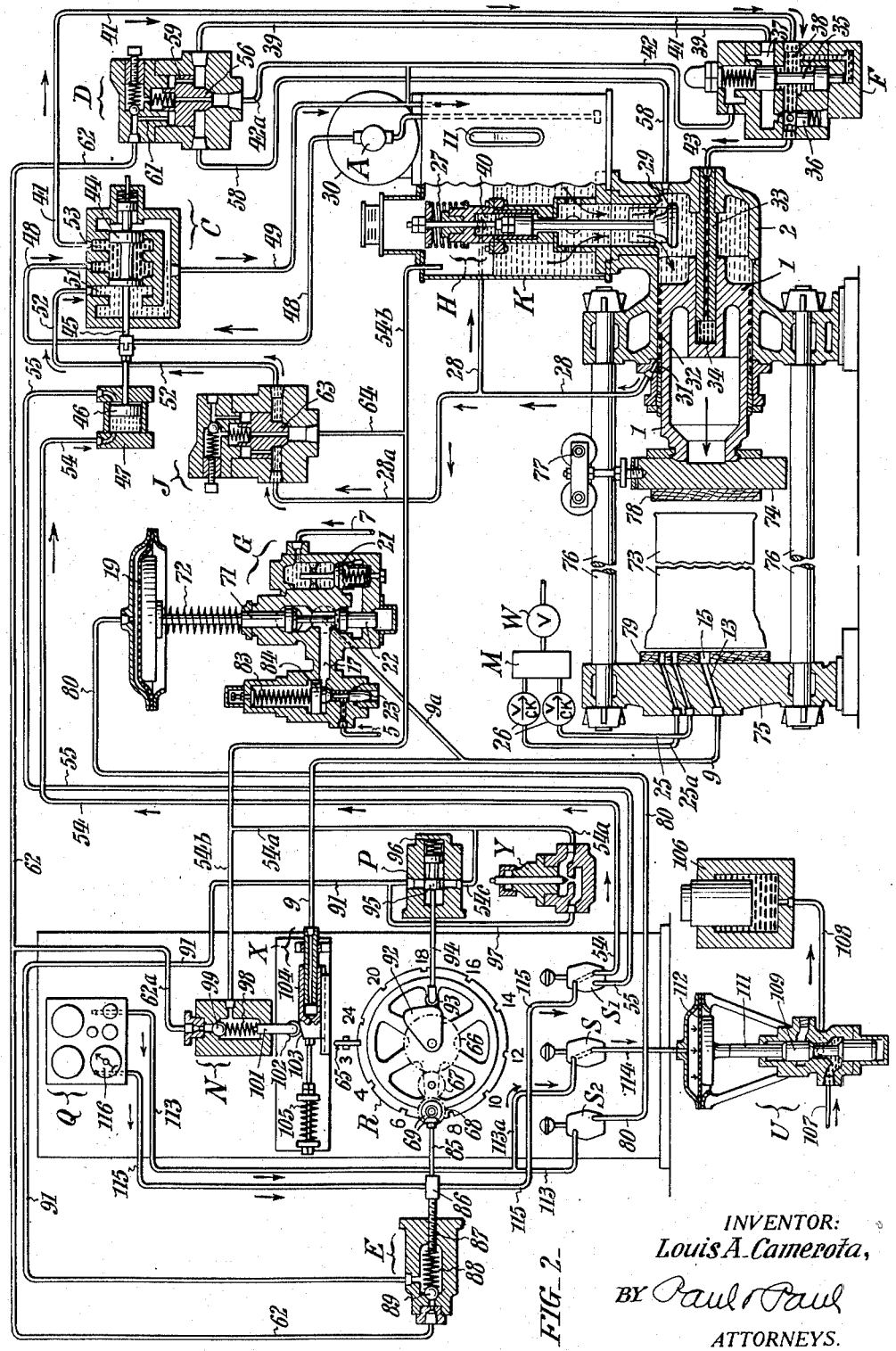

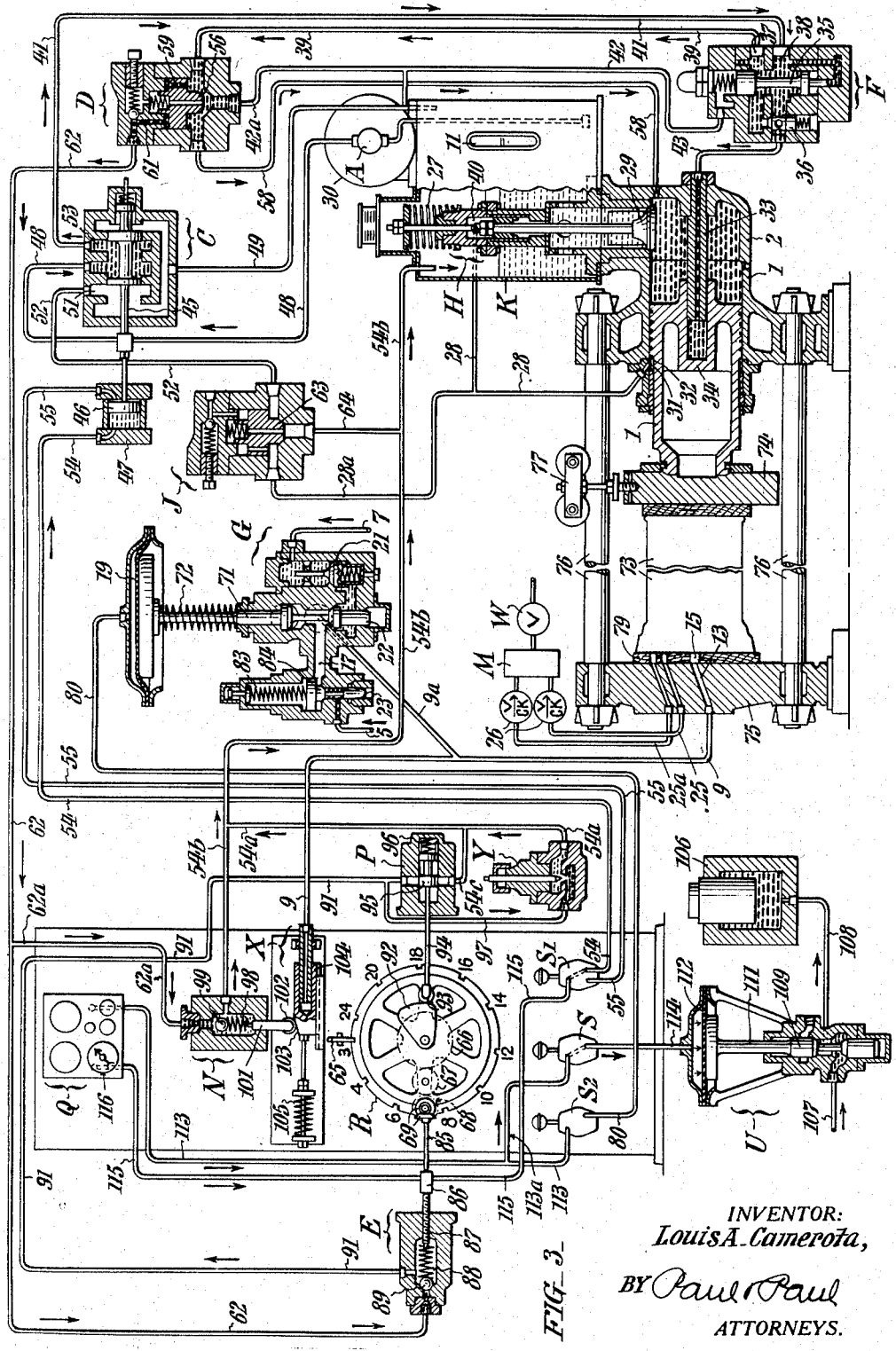

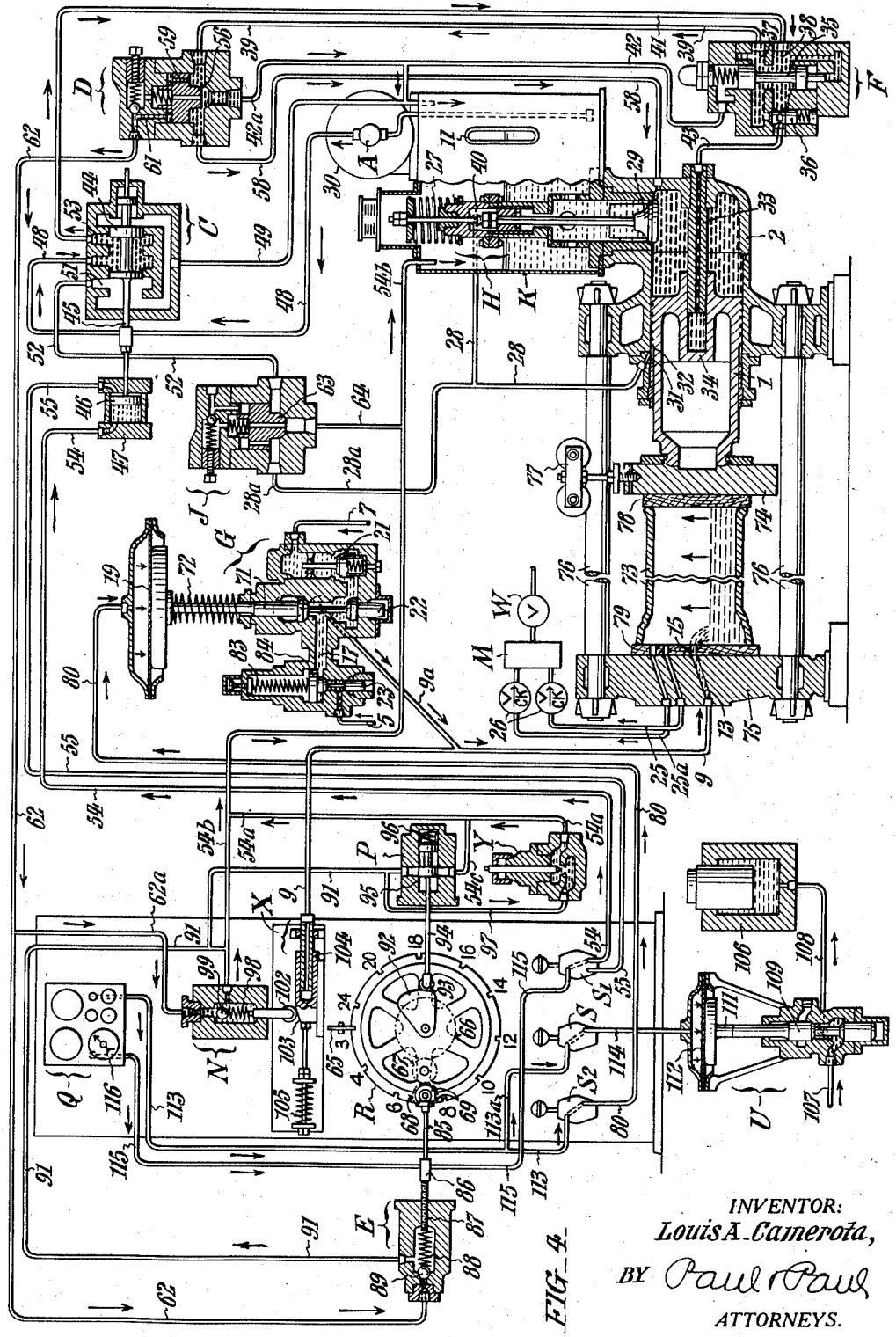

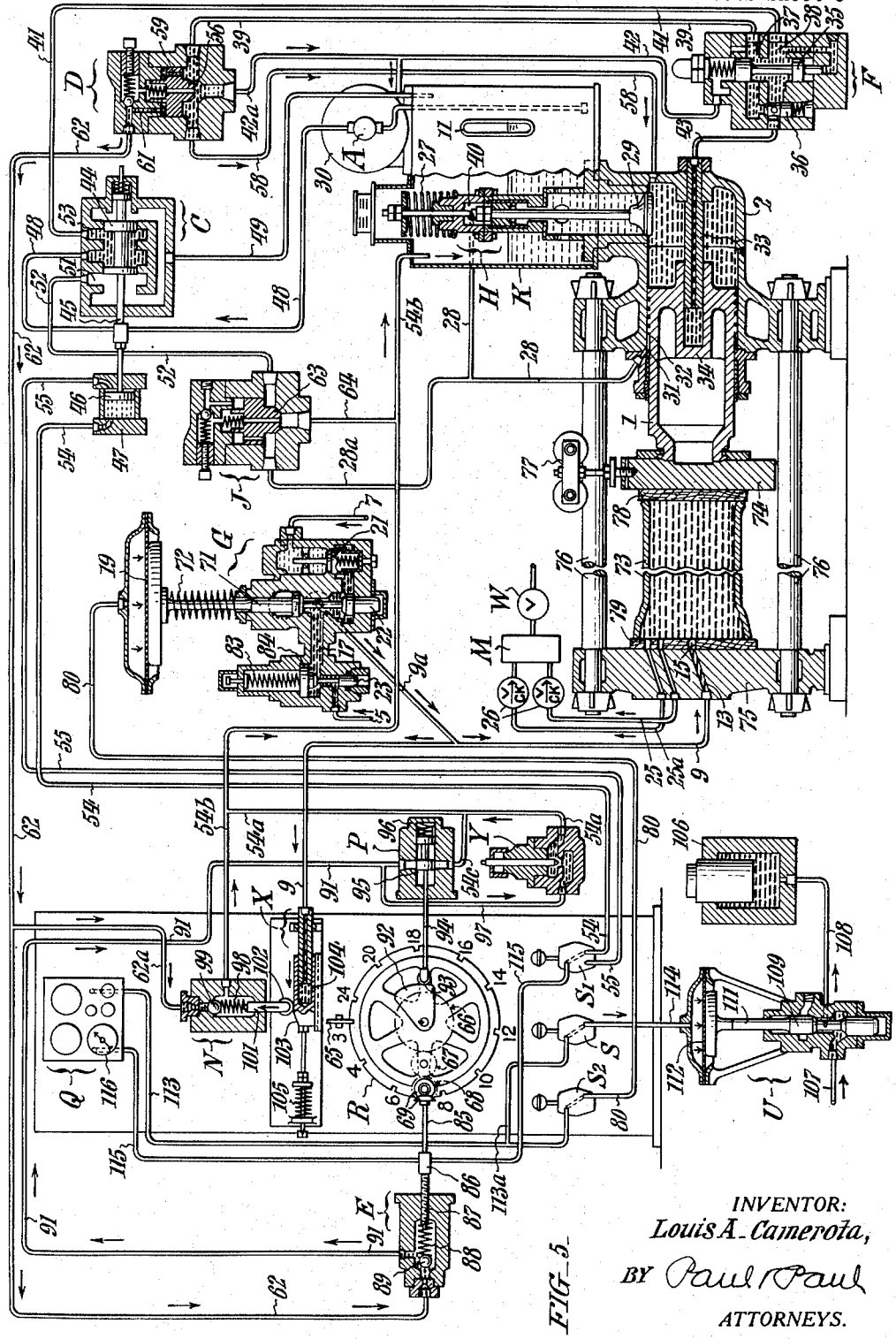

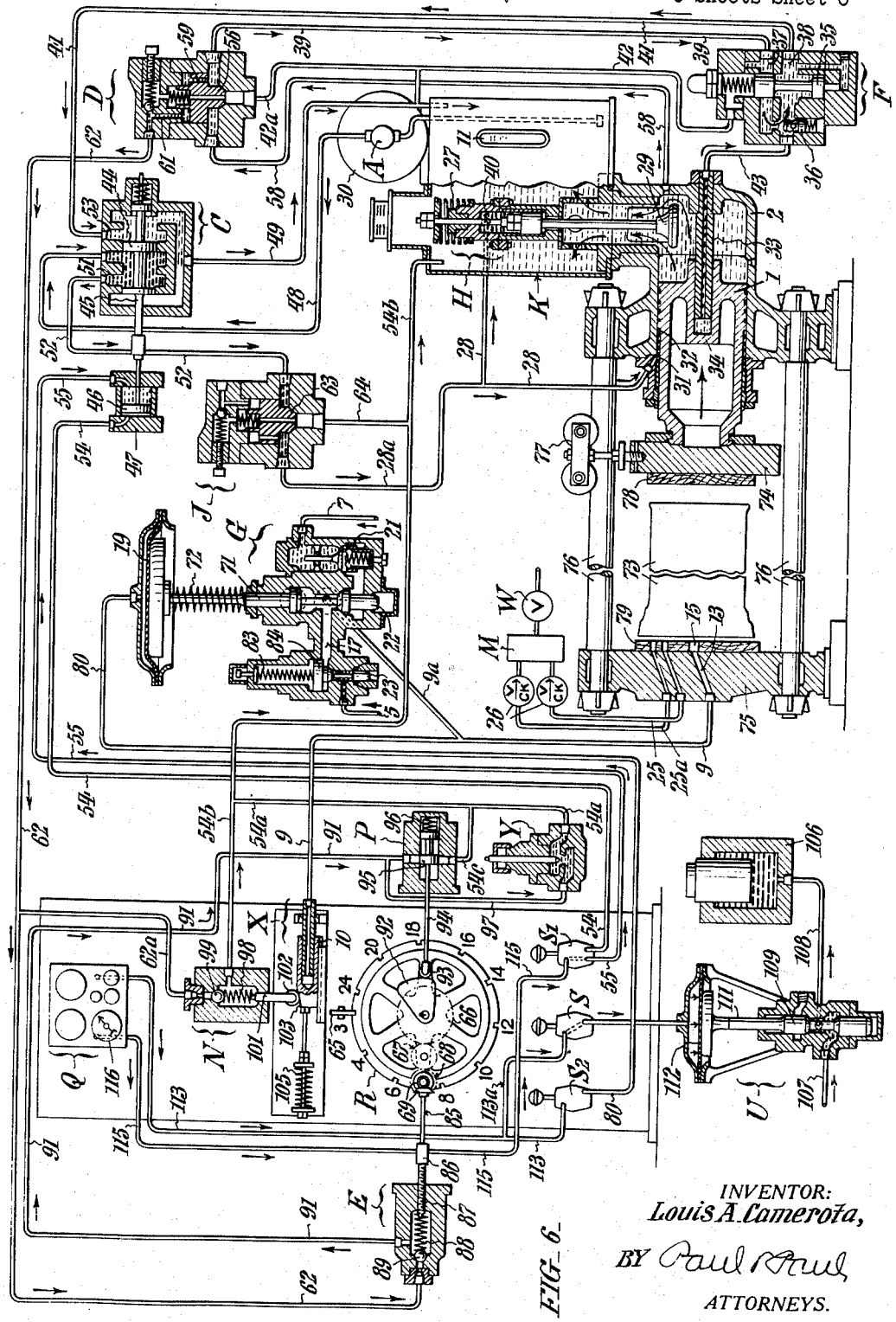

Patented Sept. 19, 1950

2,522,927

UNITED STATES PATENT OFFICE 2,522,927

PIPE TESTING MACHINE

Louis A. Camerota, Burlington, N. J., assignor to Florence Pipe Foundry & Machine Company, Florence, N. J., a corporation of New Jersey Application March 19, 1948, Serial No. 15,787

13 Claims. (Cl. 73—37)

1

This invention relates to a testing machine. Although capable of a variety of uses, it is particularly useful in its application to the testing of cast iron pipe or like hollow bodies for strength by means of hydraulic pressure applied internally.

In testing pipe by introducing fluid under pressure into the interior thereof suitable means, generally in the form of gaskets, must be provided for sealing the ends of the pipe to confine the fluid and prevent its leakage while the pressure applied internally of the pipe is built up to a predetermined value. It will readily be appreciated that the degree of pressure which would be suitable for effectively sealing the ends of a pipe of small diameter would not be sufficient for a pipe of large diameter, also that it is desirable to control the clamping pressure on the pipe, tending to seal the joint where it abuts against the gasket, in such manner that it is increased proportionally to the testing pressure applied internally of the pipe.

The principal object of the present invention is to provide an automatic control of the character indicated whereby the clamping pressure on a pipe during the testing thereof is caused to be increased within predetermined limits and in direct proportion to the increase in testing pressure within the pipe.

A further object of the invention is to provide selective control means whereby the testing apparatus may be set to operate with the required degree of clamping pressure, depending upon the size of the pipe, and thus not only to insure against an improper balancing of external pressure and internal pressure, but also to make certain that as pipes of different sizes are introduced to the apparatus such pressures will be regulated so that each pipe, regardless of size, will be subject to pressures of appropriate intensity.

Still further objects of the invention are to provide selective control means for effecting slow or rapid advance of a movable test head through which clamping pressure is exerted; to provide alternative sources of relatively high and low pressures for the testing fluid admitted to the interior of the object under test; and to provide a combination of manually operated and automatic controls whereby the intensity of the clamping pressure may not only be proportionately increased in response to an increase in the internal testing pressure, but may also be varied according to the will of the operator, so that different effects may be obtained with different

2 sizes of objects, or with different size ranges, all without exceeding pressures of a magnitude which would cause injury to the object or the gaskets for sealing the ends thereof.

Other more specific objects and advantages of the invention will become more apparent from the description of one embodiment of the invention as hereinafter set forth with reference to the accompanying drawings, whereof:

Fig. 1 represents a pipe testing machine of my invention with the control wheel set for the testing of three inch diameter pipe and with the ram, the various control valves and other elements of the system in readiness for operation; and Figs. 2 to 6 inclusive represent the machine in the various stages of its operation, showing for each successive stage the positions of the valves and other movable elements, as well as the direction of flow in the pipe lines.

In all the drawings the direction of flow of fluid under pressure is indicated by arrows and variations in the intensity of pressure, during the various stages of the operation are indicated to the extent that relatively light broken lines indicate relatively low pressures whereas relatively heavy broken lines indicate relatively heavy pressures in the pipe under test, the main and auxiliary ram cylinders and certain of the valve chambers.

In the drawings there is shown an embodiment of the invention which is particularly suited for the testing of cast iron pipe. It consists of a hydraulically operated ram 1 mounted in a main cylinder 2 and serving to apply clamping pressure for sealing the ends of a pipe 73 through a movable test head 74. In order to restrain the pipe 73 against endwise movement while under test, a stationary test head 75 engages one end thereof, this test head being connected to the cylinder 2 by tension rods 76. The movable test head 74 is rigidly connected to the ram 1 and is guided and supported by a roller carriage 77 which rides upon the upper tension rods 76. In this manner the proper alignment of the movable test head 74 with the stationary test head 75 is preserved at all times. Interposed between the ends of the pipe 73 and the movable and stationary test heads 74, 75 are gaskets 78 and 79 which serve to seal the ends of the pipe against escape of the testing fluid applied to the interior thereof.

In the particular example of the invention illustrated and described herein testing fluid for internal application to the pipe to test the strength thereof consists either of high pressure water admitted to a pressure valve G, through one source, pipe line 5, or of low pressure water admitted to the same valve through a second source, pipe line 7. Such testing fluid, under high or low pressure as desired, is carried from pressure valve G to the interior of pipe 73 through pipe lines 9a, 9 and suitable orifices 13, 15 in the stationary test head 75 and the gasket 79 associated therewith.

Pressure valve G is air operated, its low pressure spindle 71 being held normally closed by means of a spring 72 and being opened whenever air pressure in a pipe line 80, leading to a chamber having a diaphragm 19 attached to the spindle 71, reaches a predetermined value. When the spindle 71 is lowered, low pressure water may pass from pipe line 7 through a check valve 21 and around valve element 22 to pipe line 9a. When the spindle 71 is raised, under the influence of spring 72, low pressure water is cut off from communication with pipe line 9a. Pressure valve G also includes a spring-influenced high pressure spindle 23 which controls the admission of high pressure water from pipe line 5 to chamber 17 and thence to pipe line 9a. Whenever the pipe to be tested is filled with the pressure fluid from the low pressure source 7, and the pressure in the pipe is allowed to build up to a certain point, say a pressure of one hundred and twenty-five pounds per square inch, such pressure is sufficient to lift the high pressure spindle 23, against the pressure of its spring 83, unseating valve element 84 and causing high pressure water to flow from pipe line 5 to chamber 17 and thence through pipe lines 9a and 9 to pipe 73. As a master control for the operation of the high pressure spindle 23 air vents 25, 25a and an air valve W are provided. The vents 25, 25a, each of which is provided with a check valve 26, permit the discharge of air from the pipe to be tested into an air manifold M as the pipe fills with water. When the air has been thus exhausted and the pipe is filled with water, master control air valve W is closed, and with its closure pressure in the pipe may be increased until the maximum test pressure is reached.

Desirably the ram 1 is operated by oil pressure the intensity of which is varied to increase or diminish the clamping pressure upon the pipe to be tested. The oil system consists of a tank K, an oil pump A driven by a motor 30 and a number of valves so arranged and related to each other and to the various elements of the system that their functions may be varied with resultant variations in the amount of oil by-passing the ram operating means, by the rotation of a control wheel R which is adapted to be set in any one of a large number of different positions corresponding to different sizes of pipes to be tested. Oil from tank K, the level of which may be indicated by means of a gauge 11, is admitted to the main cylinder 2 or returned therefrom to the tank through a filling check valve H. Such filling check valve H is normally held closed by a spring 27 but is adapted to open whenever oil pressure in its chamber 49 admitted from a pipe line 28 reaches a predetermined value. During rapid advance of the ram 1 the valve element 29 of filling check valve H opens permitting oil to flow quickly from tank K to main cylinder 2. On the return stroke of the ram 1 valve element 29 is also unseated as pressure builds up in the pipe line 28 which leads to a pull-back cylinder 31 wherein the fluid acts upon a shoulder 32 of ram 1 to return it to its original position.

The ram 1 is operated by main and auxiliary elements. Under certain conditions oil under pressure instead of being admitted to the main cylinder 2 is admitted to an auxiliary cylinder 33 which is so disposed within the main cylinder 2 and related to the ram 1 that the oil acts upon a relatively small area of the ram within a central cylindrical portion thereof designated at 34 in the drawings, and hence serves to effect a rapid advance of the movable test head 74. A sequence and check valve F controls the admission of oil to the auxiliary cylinder 33 to effect the rapid advance of the ram 1. This valve F includes a spring-influenced piston 35, a spring-influenced check valve element 36, ports 37 and 38, leading respectively to pipe lines 39 and 41, a drain line 42, and a pipe connection 43 leading to the auxiliary cylinder 33.

The advance and return of the ram 1 is generally controlled by means of a four-way control valve C which has a piston 44 actuated by a rod 45 connected to a separate piston 46 in an air cylinder 47. In its neutral position, as shown in Fig. 1, the piston 44 allows oil under pressure to be admitted to the interior of control valve C through a pipe line 48 and to be exhausted to tank K through pipe line 49, and also to be exhausted through port 51 and pipe line 52. In this position port 53 is closed preventing communication with pipe line 41. When air under pressure is admitted to air cylinder 47 through pipe line 54, as shown in Figs. 2 to 5, pistons 44 and 46 moved to the right, connecting pipe lines 48 and 41 through port 53, whereas when air under pressure is admitted to air cylinder 47 through pipe line 55, as shown in Fig. 6, pistons 44 and 46 are moved to the left, connecting pipe lines 48 and 52 through port 51.

Associated with the oil pressure control system are two relief valves D and J. Relief valve D controls pressure in the main cylinder 2, while relief valve J controls pressure in the pull-back cylinder 31. The relief valve D includes a spring-influenced apertured piston 56 which when lifted allows communication between pipe lines 39, 42a and 58, as shown in Figs. 3, 4 and 5, and also allows a portion of the oil to escape through the apertures 59 and 61 to pipe connection 62. Similarly relief valve J includes a spring-influenced apertured valve element 63 which when lifted allows communication between pipe lines 28a, 52 and 64.

Control wheel R is manually operated and has a series of notches around its circumference which are adapted to be engaged by a latch 65, each notch being designated with a numerical figure corresponding to a size of pipe to be tested. For example, when the latch 65 engages the notch designated at 3, the control wheel R is properly set for the testing of pipe of three-inch diameter; when the latch 65 engages the notch designated at 4, the control wheel R is properly set for the testing of pipe of four-inch diameter; and similarly for pipes of other sizes. On control wheel R there is a gear 66 which meshes with an idler gear 67 which in turn drives a gear 68. Gear 68, through bevel gears 69, effects a rotation of a shaft 85 which, through the medium of a slip-joint 86 connected with a threaded stem 87, regulates the pressure of a spring 88 in relief valve E. In an obvious manner as the control wheel R is turned in a clockwise direction from one position to another, say from the setting for a three-inch pipe to the setting for a four-inch pipe, the threaded stem 87 of relief valve E moves in a direction to increase the effective pressure of spring 88, whereas with counter-clockwise rotation of control wheel R the effective pressure of spring 88 is decreased. Relief valve E includes a valve element 89, shown as a ball valve, which controls the flow of oil from pipe line 62 to pipe line 91. Hence the setting of control wheel R governs, by remote control, the amount of oil discharged from the top of relief valve D which in turn governs the degree of pressure applied to the ram 1 during high pressure testing.

Control wheel R is further provided with a cam segment 92 which is adapted to engage a roller 93 on the end of a valve stem 94 for actuating a piston 95 of a pilot valve P. When the control wheel R is set for testing three-inch or four-inch pipe, the cam segment 92 urges piston 95 to the right to the position shown in all figures of the drawings, but when the control wheel is set for testing pipes of other sizes, cam segment 92 will disengage roller 93 whereupon, under the influence of a spring 96, piston 95 will move to the left. When the piston 95 of the pilot valve P is thus moved to the left, communication is open between pipe line 91 and pipe line 54c, permitting the passage of oil from the relief valve E to pipe line 54c, thence to pipe lines 54a and 54b to tank K, whereas when the piston 95 is moved to the right under the influence of cam segment 92, oil from relief valve E is shut off at pilot valve P and must, therefore, pass through pipe line 91 to a manually adjustable needle valve Y. Accordingly needle valve Y also serves as a relief valve co-operating with relief valves D and E to control the amount of oil which by-passes main cylinder 2 in such manner as to reduce to the proper degree the clamping pressure applied to the end of pipe 73 when testing pipes within a particular range of sizes, namely pipes of three or four-inch diameter. Needle valve Y is thus rendered operative under conditions when the spring 88 of relief valve E offers little resistance to the movement of ball valve 89.

An additional relief valve N performs the function of discharging oil from the top of the piston 56 of relief valve D to control pressure admitted to the main cylinder 2, except during the period when the pipe is subjected to high test pressure. Relief valve N includes a spring 98 acting upon a valve element 99, shown as a ball valve, which controls the flow of oil from pipe line 62a to pipe line 54b. The effective pressure of spring 98 is rendered variable by means of valve stem 101 which has a roller 102 which engages a cam surface 103 of a piston operated cam X. When pipe line 9 is filled with high pressure water the cylinder 104 of piston operated cam X is moved to the left to the position represented in Fig. 5, in which case cam surface 103 causes valve stem 101 to be raised thus increasing the pressure of spring 98 in relief valve N. Under all other circumstances the cam cylinder 104, urged to the right by a spring 105, is caused to occupy a position in which valve stem 101 is lowered so that spring 98 exerts only its normal pressure upon valve element 99.

The testing apparatus includes a lifting cylinder 106 which may be assumed to control a centering device (not shown) for centering the pipe to be tested in proper position in alignment with the stationary and movable test heads 75, 74. Such centering devices are well known in the art and need not be described in this application. High pressure water is admitted to lifting cylinder 106 through pipe lines 107 and 108 when a three-way valve U is open. This three-way valve U includes a valve element 109 actuated by a spindle 111 connected to a diaphragm 112. When air under pressure is admitted to the top of valve U above diaphragm 112 the valve element 109 permits passage of high pressure water from pipe line 107 to pipe line 108 and thence to lifting cylinder 106. Otherwise valve U is closed.

The control system also includes a series of air valves, S, S—1, S—2, of which valves S and S—2 may be assumed to constitute ordinary manually controlled two-position valves. Air valve S controls the flow of air from pipe lines 113, 113a to a pipe line 114 and thence to three-way valve U thereby controlling the operation of lifting cylinder 106. Air valve S—2 controls the flow of air under pressure from pipe line 113 to pipe lines 80 and thence to pressure valve G thereby controlling the position of the low pressure spindle 71 of pressure valve G. Air valve S—1 may be assumed to be a three-position valve. In one position of said air valve S—1 air in pipe line 115 is connected to pipe line 54 to operate the piston 46 of air cylinder 47 in one direction; in a second position such air under pressure is connected to pipe line 55 to operate piston 46 in the opposite direction; and in a third position air is shut-off from pipe lines 54 and 55 to maintain piston 46 in a neutral position.

Desirably by means of an air pressure reducing unit shown diagrammatically at Q the normal air pressure, such as the pressure in pipe line 115, is reduced to a lesser amount, say thirty-five pounds per square inch, to operate on pressure valve G and lifting cylinder valve U. A pressure gauge 116 is connected with pipe line 115 to show the degree of air pressure in said line.

The operation of the testing apparatus of this invention is as follows. Let it be assumed that it is desired to test a pipe of three inch diameter and that the control wheel R has been set and latched at its notch corresponding to the numeral "3". Oil pump A is set in operation by starting the motor 30. Four-way control valve C is in neutral position so that oil from tank K is delivered by pump A to pipe line 48 and thence to valve C and is discharged from valve C to tank K through pipe line 49, thus by-passing other elements of the system. The cam segment 92 on control wheel R holds pilot valve P closed. Air valve S being open admits air to lifting cylinder valve U whereby the pipe 73 is lifted to its proper test position by lifting cylinder 106. Low pressure and high pressure water are available but closed off by pressure valve G. Air supply is available at valves S—1 and S—2 which are closed. The ram 1 is in its retracted position. All valves and movable elements of the system are at this point in the positions represented in Fig. 1.

With the apparatus thus in readiness for operation air valve S—1 is opened in such manner as to admit air under pressure to pipe line 54 moving the piston 46 of air cylinder 47 to the right and similarly moving the piston 44 of four-way control valve C to the right. Oil under pressure is discharged from port 53 of control valve C to pipe line 41 and passes through sequence and check valve F to pipe line 43 and thence to the auxiliary ram cylinder 33, causing a rapid movement of ram 1. Oil forced from the pull-back cylinder 31 through pipe line 28 enters the chamber 40 of filling check valve H moving its valve element 29 downwardly whereby oil may flow freely from tank K to the main cylinder 2. Oil from the pull-back cylinder 31 also passes through pipe line 28a, relief valve J and pipe line 52 to port 51 of control valve C and from thence discharges through pipe line 49 to tank K. The various valves and other elements of the system are now in the positions represented in Fig. 2.

As the ram 1 applies pressure against the movable test head 74 clamping the gaskets 78 and 79 against the ends of the pipe 73 the ram meets with resistance with the result that oil ceases to flow in pipe line 28 causing filling check valve H to close. Pressure then builds up in sequence and check valve F causing its piston 35 to lift and oil to flow from pipe line 41 through ports 38 and 37 to pipe line 39 and thence to relief valve D. As the pressure of the fluid in relief valve D builds up its piston 56 becomes unbalanced inasmuch as the fluid in the top of the valve is being drained through pipe lines 62, 62a valve N and pipe line 54b to tank K. Hence piston 56 raises from its seat permitting a certain amount of oil to by-pass the main cylinder, thus controlling the pressure in the main cylinder and maintaining it within predetermined limits.

Relief valve E and needle valve Y co-operate with relief valve D to reduce the pressure in the main cylinder 2 by permitting a certain amount of fluid to by-pass the main cylinder and flow through pipe line 62, relief valve E, pipe lines 91 and 97, needle valve Y and pipe lines 54a 54b to tank K.

At this stage the various valves and other elements of the system are in the positions represented in Fig. 3. It will be readily seen that the flow of oil through valves D and Y drains a certain portion of the total output of oil pump A to maintain the pressure within the main cylinder 2 at the particular intensity desired for testing three-inch pipe.

The system is now in readiness for low pressure filling of the pipe under test. To effect the application of internal pressure within the pipe the operator opens air valve S—2 allowing air under pressure to pass from pipe line 113 to pipe line 80 and thence to the chamber above the diaphragm 19 of pressure valve G. This causes the low pressure spindle 71 to be lowered, unseating valve elements 22, whereupon low pressure water flows from pipe line 7 through check valve 21 to chamber 17 and thence to pipe lines 9a, 9. Low pressure water then fills the pipe under test. At this stage the valves and other elements of the system are in the positions represented in Fig. 4.

As soon as the air has been exhausted from the pipe under test through vents 25, 25a as a result of the pipe being filled with low pressure water, air valve W is closed. As pressure builds up within the pipe under test the pressure within chamber 17 of pressure valve G ultimately reaches a point where it is sufficient to unbalance the high pressure spindle 23 causing it to lift against the pressure of its spring 83, thereby unseating valve element 84. High pressure water then flows from pipe line 5 to chamber 17 and thence through pipe lines 9a, 9 and orifices 13, 15 to the interior of the pipe under test.

As the pressure in pipe line 9 is thus increased such pressure is sufficient to operate the cylinder 104 of piston operated cam X whereby cam surface 103 moves to the left raising the stem 101 of relief valve N and causing this valve to close. Under these conditions oil from the top of relief valve D is diverted through pipe line 62 to relief valve E. The pressure within the main cylinder 2 acting upon ram 1 is now limited and controlled by relief valve E and needle valve Y, the setting of relief valve E being automatically adjusted to a setting which is appropriate for the size of pipe under test. All valves and other elements of the system are in the positions represented in Fig. 5.

Upon completion of the test, air control valve S—2 is closed causing the low pressure spindle 71 of pressure valve G to be lifted and shutting off the further admission of low pressure water to chamber 17 of valve G. Air valve W is then momentarily opened to break the pressure within the pipe whereupon, with the lowering of pressure within chamber 17 of pressure valve G, its high pressure spindle 23 lowers under the influence of spring 83. Piston operated cam X then moves to the right under the influence of spring 105, allowing valve N to take control of fluid flowing from valve D through pipe line 62. Pressure in the main cylinder 2 returns to the holding condition.

Air control valve S—1 is then operated in such manner as to cause air to flow from pipe line 115 to pipe line 55 and thus move the piston 46 of air cylinder 47 to the left, simultaneously moving the piston 44 of control valve C in the same direction, whereupon pressure from pipe line 48 causes a flow of oil through port 51 to pipe line 52. The fluid in the auxiliary ram cylinder 33 then discharges through sequence and check valve F to pipe 41 and thence through port 53 and pipe line 49 to tank K. Relief valves D and N, as well as sequence and check valve F, close as soon as pressure drops in the main cylinder 2. Oil passes through port 51, pipe line 52, valve J, and pipe lines 28a, 28 to the pull-back cylinder 31 which also applies pressure through pipe line 28 to chamber 40 of filling check valve H which then opens.

At this point oil within the main cylinder 2 is free to flow back into tank K, and similarly oil within the auxiliary cylinder 33 is free to flow through pipe line 43, sequence and check valve F, pipe line 41, port 53 of control valve C to pipe line 49 and thence to tank K. Some oil may also return to tank K through pipe line 58, relief valve D, pipe line 39, and sequence and check valve F. The greatest volume of oil, however, flows to tank K through filling check valve H. All valves and other movable elements of the system are now in the positions represented in Fig. 6.

As the pressure builds up in pull-back cylinder 31 the ram 1, which at this point has retracted the movable test head 74 to free the pipe 73, continues its movement to the right until it resumes its original position.

In testing pipe of larger diameter, for example pipes ranging from six inches to twenty-four inches in diameter, the control wheel R is rotated manually to a position where the latch 65 engages the appropriate notch of the wheel, for example, the notch marked "12" which designates the appropriate setting for a twelve inch pipe. This automatically adjusts valve E by rotation of its spindle 87 which in turn adjusts the pressure on top of relief valve D, limiting to the desired degree the clamping pressure applied by the ram 1 during the test. It will further be noted that when testing pipe larger than four inches in diameter, segmental cam 92 disengages roller 93 on valve stem 94, causing pilot valve P to open under the influence of spring 96, thereby rendering needle valve Y inoperative.

As in the operation previously described for small pipe sizes, quick advance of the ram is effected by operating air valve S—1 in such manner as to move the piston 44 of control valve C to the right, causing oil to be admitted to the auxiliary ram cylinder 33. Likewise holding pressure is applied to the ram, when it meets with resistance, as previously described. Pressure in the main cylinder 2 is thereafter controlled by relief valve D which in turn is controlled by relief valves E and N. Application of high pressure water to the interior of the pipe under test is effected as previously described and the pressure applied by ram 1 is increased automatically and proportionately as the internal test pressure increases.

Similarly, upon completion of the test, as the pressure within the pipe under test is caused to diminish, the clamping pressure is automatically and proportionately decreased.

It will be noted that of the three relief valves which are mechanically controlled, valve E is regulated by manual control, through control wheel R, to vary the clamping pressure according to the size of the object to be tested, whereas valve N is automatically controlled in response to variations in the intensity of the testing fluid pressure admitted interiorly of the pipe and is operable to vary the clamping pressure according to the testing pressure; and the third relief valve, needle valve Y, is rendered effective or ineffective according to the position of pilot valve P which in turn is dependent upon the position of control wheel R. Needle valve Y is therefore effective only when testing pipes within a certain range of sizes, three-inch and four-inch pipes in the illustrated example.

Although the description herein is confined to one embodiment of the invention particularly adapted for the testing of cast iron pipe of various sizes within a specific range, it will be readily apparent that the invention is equally applicable to the testing of other hollow bodies, varying in shape and size; that the construction of the ram, its main and auxiliary cylinder, and associated elements, and the form of the various control valves, relief valves, cams and other mechanism described herein may be varied considerably to suit different conditions including different size ranges; and that certain features of the invention may at times be used to advantage without a corresponding use of other features. It will also be apparent that various reversals of parts, and substitutions of equivalent mechanism may be made in the apparatus specifically described and illustrated, all without departing from the spirit of the invention as defined in the annexed claims.

Having thus described my invention, I claim:

1. In a hydraulic testing machine for testing hollow bodies; fluid pressure means for sealing the ends of the test body including a movable test head, ram means for applying clamping pressure through the test head, and hydraulic mechanism for varying the intensity of the clamping pressure exerted by said ram means; means for supplying fluid under pressure to the interior of the test body including valve means for varying the intensity of such fluid pressure and a second valve means having a movement responsive to such variations; and control means, including selective mechanism for regulating the intensity of the initial clamping pressure applied by said ram means, and a connection between said hydraulic mechanism and said second valve means for automatically increasing the intensity of such clamping pressure in response to an increase in the intensity of the fluid pressure applied interiorly of the test body.

2. In a hydraulic testing machine for testing hollow bodies; fluid pressure means for sealing the ends of the test body including a movable test head, a cylinder having a ram for applying clamping pressure through the test head, and means for varying the intensity of the pressure exerted by said ram comprising a relief valve operable to cause a portion of the pressure fluid to by-pass the ram cylinder; means for supplying fluid under pressure to the interior of the test body including valve means for controlling the intensity of such fluid pressure and a second valve means having a movement responsive to variations in such fluid pressure; and control means including a connection between said second valve means and relief valve for automatically operating said relief valve to reduce the amount of by-passing pressure fluid and thus to increase the intensity of the clamping pressure applied by said ram in response to an increase in the intensity of the fluid pressure applied interiorly of the test body.

3. In a hydraulic testing machine for testing hollow bodies; fluid pressure means for sealing the ends of the test body including a movable test head, cylinder means having main and auxiliary ram elements for applying clamping pressure through said test head, the auxiliary ram element serving to effect rapid advance of the test head, and hydraulic mechanism for varying the intensity of the pressure exerted by said ram elements; means for supplying fluid under pressure to the interior of the test body including valve means for controlling the intensity of such fluid pressure and a second valve means having a movement responsive to variations in such fluid pressure; and control means including mechanism for automatically admitting holding pressure to the main cylinder as a result of the movement of said test head under action of the auxiliary ram element, and also including a connection between said second valve means and hydraulic mechanism for automatically increasing the intensity of the pressure in said main cylinder in response to an increase in the intensity of the fluid pressure applied interiorly of the body.

4. In a hydraulic testing machine for testing hollow bodies; fluid pressure means for sealing the ends of the test body including a movable test head, cylinder means having main and auxiliary elements for applying clamping pressure through said test head, the auxiliary element serving to effect rapid advance of the test head, and hydraulic mechanism for varying the intensity of the pressure exerted by said main element and by said auxiliary element; means for supplying fluid under pressure to the interior of the test body including valve means for varying the intensity of such fluid pressure; and a second valve means operable in response to said variations; and a connection between said second valve means and said hydraulic mechanism whereby the intensity of the pressure exerted by said main and auxiliary elements is automaticaly and proportionately increased as the intensity of the fluid pressure applied interiorly of the test body is increased.

5. In a hydraulic testing machine for testing hollow bodies; fluid pressure means for sealing the ends of the test body including a movable test head, ram means for applying clamping pressure through the test head, and hydraulic mechanism for varying the intensity of the clamping pressure exerted by said ram means; means for supplying fluid under pressure to the interior of the test body including pressure valve means connected to sources of relatively high and low pressures and having one valve element operable to admit low pressure fluid to the pipe and another valve element operable automatically to admit high pressure fluid to the pipe when the low pressure fluid therein reaches a predetermined intensity; and additional valve means operable in response to said variations in pressure, and a connection between said additional valve means and said hydraulic mechanism whereby the intensity of the clamping pressure exerted by said ram means is automatically and proportionately increased as the intensity of the fluid pressure applied interiorly of the test body is increased.

6. In a hydraulic testing machine for testing hollow bodies; fluid pressure means for sealing the ends of the test body including a movable test head, means for applying clamping pressure through the test head, and hydraulic mechanism for varying the intensity of the clamping pressure; means for supplying fluid under pressure to the interior of the test body including valve means for varying the intensity of such fluid pressure; and control means whereby the intensity of the clamping pressure exerted by said test head is automatically increased as the intensity of the fluid pressure applied interiorly of the test body is increased, said control means including a selective control element adapted to be set in a series of different positions, corresponding to different sizes of test objects, and means including a valve element responsive to variations in pressure within the test body and valve element actuated by said control element operable automatically to control the aforesaid hydraulic mechanism for varying the intensity of the clamping pressure.

7. A hydraulic testing machine as defined in claim 6 wherein the control element is in the form of a wheel, and latch means are provided for setting said wheel in different positions.

8. A hydraulic testing machine as defined in claim 6 wherein the control element is in the form of a wheel having a revolving cam for actuating the valve means for varying the clamping pressure.

9. A hydraulic testing machine as defined in claim 6 wherein the control element is in the form of a wheel having a revolving cam for actuating one valve means for varying the clamping pressure, and having a gear for actuating a second such valve means.

10. In a hydraulic testing machine for testing hollow bodies; fluid pressure means for sealing the ends of the test body including a movable test head, hydraulic mechanism for applying clamping pressure through the test head, and relief valves for varying the intensity of the clamping pressure; means for supplying fluid under pressure to the interior of the test body including valve means for varying the intensity of such fluid pressure; and control means, including a manually controlled valve element operable to regulate one of said relief valves for selectively varying the clamping pressure according to the size of the object to be tested, and a valve element responsive to variations in the intensity of the testing fluid pressure admitted interiorly of the test body and operable to open or close a second one of said relief valve further to vary the clamping pressure automatically according to the intensity of the testing pressure.

11. A hydraulic machine as defined in claim 10 wherein the automatically controlled element for operating the second relief valve is in the form of a piston and cylinder actuating a cam in engagement with the stem of said second relief valve.

12. In a hydraulic testing machine for testing hollow bodies; fluid pressure means for sealing the ends of the test body including a movable test head, hydraulic mechanism for applying clamping pressure through the test head, and relief valves for varying the intensity of the clamping pressure; means for supplying fluid under pressure to the interior of the test body including valve means for varying the intensity of such fluid pressure; and control means, including a manually controlled element operable to regulate one of said relief valves for selectively varying the clamping pressure according to the size of the object to be tested, a valve element responsive to variations in the intensity of the testing fluid pressure admitted interiorly of the test body and operable to open or close a second one of said relief valves further to vary the clamping pressure automatically according to the testing pressure, and an additional control element actuated by said manually controlled element and operable to render a third one of said relief valves effective when testing bodies within a certain range of sizes.

13. A hydraulic testing machine as defined in claim 12 wherein the additional control element is in the form of a pilot valve actuated by a cam on said manually controlled element.

LOUIS A. CAMEROTA.

REFERENCES CITED

The following references are of record in the file of this patent:

UNITED STATES PATENTS

| Number | Name | Date |
|---|---|---|
| 1,613,150 | Zore | Jan. 4, 1927 |
| 1,811,138 | Lassman | June 23, 1931 |
| 2,135,721 | Landenberger | Nov. 8, 1938 |
| 2,231,807 | Hybarger | Feb. 11, 1941 |
| 2,329,035 | Cross | Sept. 7, 1943 |